Patented Aug. 16, 1938

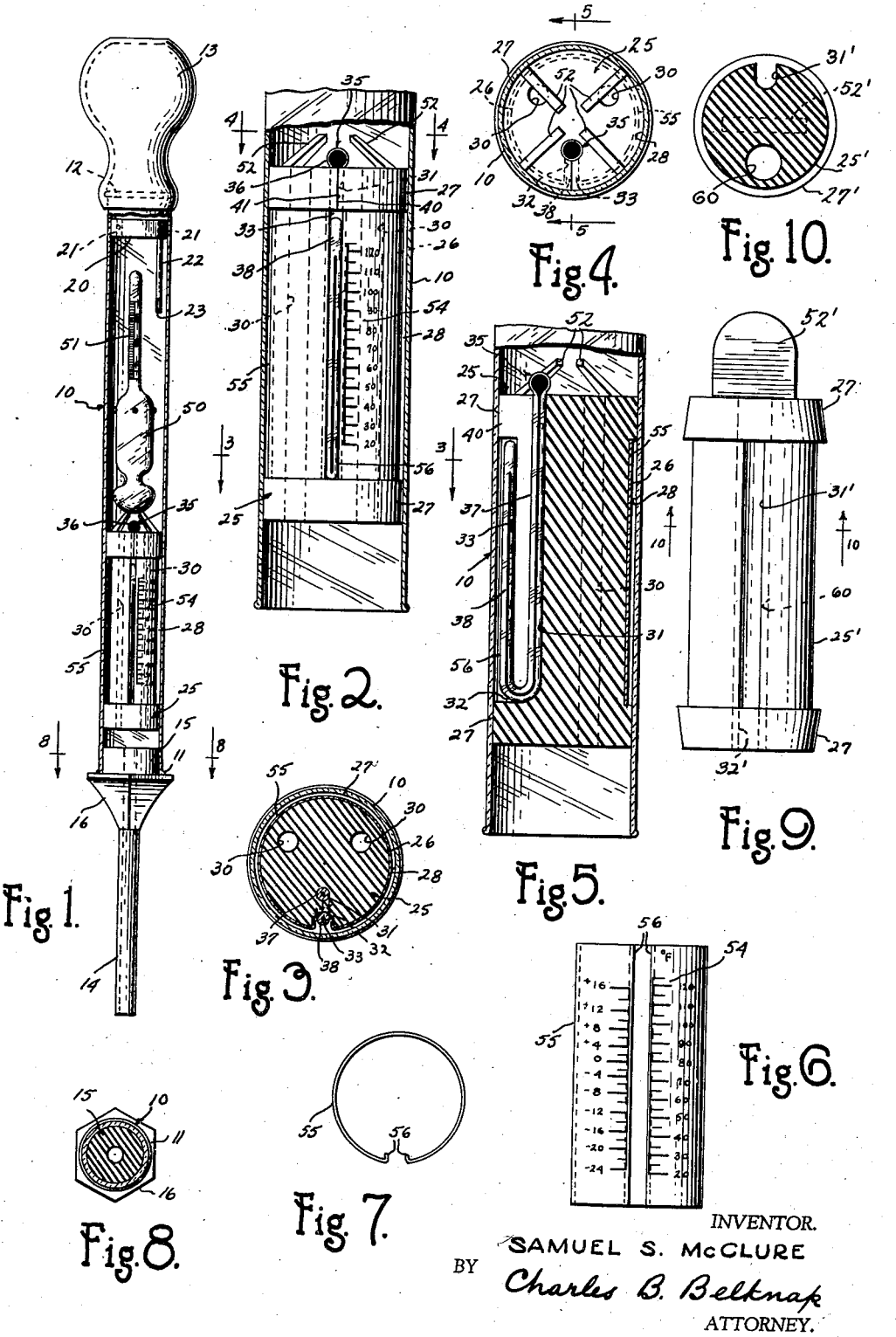
Aug. 16, 1938.  S. S. McCLURE  2,127,065
HYDROMETER
Filed April 27, 1937
INVENTOR.
SAMUEL S. McCLURE
BY Charles B. Belknap
ATTORNEY.

2,127,065

UNITED STATES PATENT OFFICE 2,127,065

HYDROMETER

Samuel S. McClure, Vineland, N. J., assignor to Kimble Glass Company, Vineland, N. J., a corporation of Illinois Application April 27, 1937, Serial No. 139,285

10 Claims. (Cl. 265—46)

This invention relates to hydrometers and has particular reference to a thermo-hydrometer by which both the temperature and the specific gravity or the like of the liquid being tested may be determined.

One of the primary objects of this invention is to provide a thermo-hydrometer of the above-mentioned type which will be compact in construction and in which both the thermometer and hydrometer scales may be readily viewed.

The invention further contemplates the provision of a construction in which the liquid being tested will not interfere with the reading of the thermometer scale.

Still further the invention contemplates the provision of a construction in which the temperature-influenced portion of the thermometer will be located in the liquid in which the hydrometer float is located with the result that an accurate temperature determination may be obtained.

Numerous other objects and advantages of this invention will become more apparent as the following description proceeds particularly when reference is had to the accompanying drawing wherein:

Fig. 1 is a side elevational view of a thermo-hydrometer constructed in accordance with the teachings of this invention;

Fig. 2 is an enlarged elevational view of a portion of the structure shown in Fig. 1;

Fig. 3 is a sectional view taken substantially on the line 3—3 of Fig. 2;

Fig. 4 is a sectional view taken substantially on the line 4—4 of Fig. 2;

Fig. 5 is a fragmentary longitudinal sectional view taken substantially on the line 5—5 of Fig. 4;

Fig. 6 is a side elevational view of one of the elements forming a part of the construction shown in Fig. 5;

Fig. 7 is an end elevational view of the element shown in Fig. 6;

Fig. 8 is a sectional view taken substantially on the line 8—8 of Fig. 1;

Fig. 9 is a front elevation of a modified form of plug; and

Fig. 10 is a section taken on line 10—10 of Fig. 9.

Heretofore in the construction of thermo-hydrometers it has been generally the practice to provide a well or the like adjacent the lower end of the hydrometer barrel and to locate the bulb portion of the thermometer in this well. In use, a portion of the liquid drawn into the barrel was retained in the well, while the remaining liquid passed up into the barrel to be tested by the hydrometer float.

In these constructions it has been found that there was a substantial difference in the temperature between the liquid in the well and the liquid in the major portion of the hydrometer barrel, due to the fact that the heat was dissipated by the cold barrel and the other parts of the hydrometer. According to the present invention, the bulb portion of the thermometer is located adjacent the hydrometer float, and thus measures the temperature of the liquid in which the float is located, with the result that more accurate readings may be obtained. Under the teachings of the present invention, it is not necessary to make rapid readings of the thermometer and the hydrometer, since, regardless of the length of time which elapses between the taking of the sample to be tested and the actual test, the relationship between the temperature and the specific gravity is constant, because the same liquid is being tested for both temperature and specific gravity.

Additionally, under the teachings of the present invention, the liquid which is being tested and which is generally discolored, is prevented from surrounding the portion of the thermometer which is to be read with the result that no difficulty is experienced in obtaining a clear and accurate reading of the thermometer.

Referring now to the drawing wherein like reference characters designate corresponding parts throughout all views, the numeral 10 designates a hydrometer barrel, this barrel being preferably made of glass or some other transparent material, and being provided at its ends with the reinforcing beads 11 and 12. At its upper end the barrel is provided with the usual liquid suction and expelling bulb 13, while at its other end the barrel is provided with a flexible suction tip or tube 14 through which the liquid may be drawn into the barrel.

The tube 14 is carried by and is preferably formed integral with a plug 15 which is inserted in the lower end of the barrel, and formed integral with the plug and tube is a flared portion 16 which abuts the lower end of the barrel and which is of greater diameter than the barrel so as to prevent liquid from running down the sides of the barrel should the instrument be inverted. As illustrated in Fig. 8 of the drawing, the skirt or flared portion 16 of the suction nozzle may be multi-sided so as to prevent the barrel from rolling in the event that it is laid on its side.

Fitted snugly in the barrel 10 adjacent the upper end thereof is a resilient plug 20 provided with openings 21 through which liquid may pass from the barrel into the bulb 13. Fitted in one of the openings through the plug 20 is a tube 22 and this tube projects downwardly into the barrel terminating in an open end 23. The tube 22 constitutes what might be termed an overflow device in that it limits the level to which the liquid may be drawn into the barrel 10. Thus when the bulb is compressed and then released to draw liquid into the barrel, the liquid will pass upwardly into the barrel until it reaches the lower end of tube 22 and then will pass upwardly through this tube into the bulb.

Fitted snugly in the barrel 10 adjacent the lower end thereof is an elongated plug 25 which may be formed of rubber or some other resilient material. This plug has a reduced body portion 26 and enlarged end portions 27 which snugly engage the inner wall of the barrel 10 to prevent liquid in the barrel, either above or below the plug, from entering the annular chamber 28 formed between the reduced body portion of the plug and the inner wall of the barrel. The plug 25 is provided with suitable holes or passages 30 through which liquid may pass upwardly into the portion of the barrel above the plug.

In addition to the holes or passages 30, the plug 25 is provided with a longitudinal recess 31 which extends from the upper end of the plug to a point adjacent the lower end thereof. Communicating with the lower end of the recess 31 is a transversely disposed recess or passage 32 which opens into the annular chamber 28. The reduced body portion 26 of the plug is provided with a groove 33 which is in vertical alignment with the transverse passage 32.

The recesses 31 and 32 and the groove 33 are adapted to receive a thermometer designated generally by the reference character 35. This thermometer is provided with a bulb portion 36 which is disposed above the upper end of the plug 25 and which is thus exposed to the liquid in the barrel 10 between plug 25 and plug 20. The capillary tube of the thermometer is substantially U-shaped, being provided with one leg 37 which is snugly received in the recess 31, and being provided with a second leg 38 which fits in the groove 33 formed in the plug 25. The base of the U-shaped portion of the capillary tube is received in the transverse passage 32.

To provide for locating the thermometer in the plug 25, the latter is provided with a slit 40 which extends from the edge of the upper enlarged portion 27 of the plug to the recess 31 and which extends from the groove 33 to the recess 31 through the reduced portion of the plug. The arrangement is such that by exerting pressure on the opposite sides of the slit before the plug is inserted in the barrel, the slit may be opened sufficiently wide to permit forcing of the leg 37 of the thermometer into the recess 31 so that the thermometer assumes the position shown in Fig. 5 of the drawing. Because of the resiliency of the plug 25 the slit will be closed as soon as pressure on opposite sides thereof is relieved, with the result that the thermometer is firmly clamped in the plug 25 and the legs of the thermometer are prevented from contacting the liquid being tested. If desired, and to insure that no liquid will leak down through the upper end of the slit and into the annular chamber 26, the upper end of the slit may be sealed shut by cement or the like as indicated by the reference character 41.

Located in the barrel 10 between the plug 25 and the plug 20 is a hydrometer float 50 which may be of any desired character and which is provided with a scale 51 which may be of any desired type. In other words, the scale 51 may give direct freezing temperatures or may merely give indicia which may be utilized in later computing the actual freezing temperature by reference to a suitable correction chart.

To prevent the hydrometer float from contacting and injuring the thermometer bulb 36, the plug 25 is provided on its upper end with upwardly and inwardly projecting lugs or fingers 52. These fingers extend above the thermometer bulb 36, as clearly illustrated in Figs. 1, 2 and 5, and constitute a support on which the hydrometer float may rest when the barrel 10 is empty of liquid.

The scale 54 against which the temperature responsive medium in the thermometer is read is located on a sleeve or collar 55 which is preferably formed of celluloid or some other shape-retaining material. The longitudinal edges of the sleeve 55 are bent inwardly as at 56 and these inturned edge portions are forced into the groove 33 so as to retain the sleeve 55 in position. It will be noted that the sleeve 55 surrounds the reduced portion of the plug 25, the annular chamber 28 providing a suitable space for receiving this sleeve.

In the embodiment of the invention illustrated, the thermometer scale is calibrated from 0 to 120° F., although it will be obvious that any suitable range of temperatures might be selected. In any event, however, the scales or sleeves are arranged in groups, the distance between the minimum and maximum temperatures on the scales being the same in any one group.

The groups in turn are arranged in a series, the distances between minimum and maximum temperatures varying through the series.

This is necessitated by the fact that the minimum and maximum temperatures fall at varying points on different thermometers so that it is necessary when assembling one of the sleeves 55 with one of the plugs 25 to choose a sleeve having a scale which corresponds to the thermometer with which the scale is to be associated. Thus the height of the indicating medium in the vertical leg 38 of the thermometer may be read against the scale 54 with which it is associated and an accurate temperature reading of the solution thus obtained.

In assembling the construction, the plug 20 may first be fitted in the upper end of the barrel 10 and then the liquid suction and expelling bulb 13 is fitted over the upper end of the barrel. The hydrometer float 50 may then be inserted in the barrel through the lower end thereof and then the plug 25 with which a thermometer has previously been associated, is forced upwardly into the barrel to the position illustrated. The reduced body portion of the plug 25 facilitates manipulation of the plug so that it may be properly inserted in the barrel without placing too great a strain on the thermometer. Additionally, since the enlarged end portions of the plug snugly engage the interior of the barrel 10, it will be apparent that the slit 40 will be wholly closed and the liquid in the barrel thus prevented from entering the annular chamber 28. In addition to the fact that the leg 37 of the thermometer is snugly embraced by the portion of the plug which defines the recess 31, the thermometer bulb 36 has sealing engagement with the upper end of the recess 31 with the result that no liquid whatever may flow downwardly through recess 31 and thus enter chamber 28.

After the plug 25 has been inserted in the barrel, the plug 15 of the suction tip is fitted in the lower end of the barrel, thus completing the assembly as illustrated in Fig. 1. In operation, the tube 14 will be inserted in the liquid to be tested and the bulb 13 then compressed and released to draw the liquid into the barrel 10 through the suction tube 14 and through the passages 30 in the plug 25. The liquid will assume a level determined by the point at which tube 22 terminates in barrel 10 and a reading may then be taken on the float and on the thermometer. Since the thermometer bulb is located in the same liquid as that in which the float is located, it will be apparent that, regardless of how long an interval elapses after the taking of the sample, the thermometer will give an accurate indication of the temperature at the time of the taking of the test.

After the temperature has been read and the scale on the hydrometer also read, the specific gravity or the freezing point of the solution being tested may be determined either by reference to a suitable correction chart in accordance with the usual practice or, if the hydrometer has been calibrated at a temperature of 60°, which is the general practice, then the actual specific gravity of the solution may be determined by a process of interpolation.

In Figs. 9 and 10, there is shown a modification of the thermometer holding and barrel closing plug. In this form, the plug 25' is provided with enlarged end portions 27', which are tapered to facilitate insertion of the plug. It will be seen that the recess 31' extends from the inner face of the upper enlargement to the lower enlargement, where it is continued as a passage 32' through the lower enlargement. Passage 32' is sufficiently small in diameter to fit one leg of the thermometer snugly and prevent flow of liquid into the annular groove which corresponds to chamber 28 of Fig. 4. The plug is further bored at 60 to receive the other leg of the thermometer, that is, that leg having at its end the bulb of the thermometer. Passage 60 is relatively large in diameter and not only accommodates the thermometer, but permits passage of liquid through the passage when the thermometer is disposed therein. A lug 52' on the plug extends sufficiently above the top of the plug to prevent the hydrometer from contacting the bulb end of the thermometer.

It will be apparent from the above that the invention provides a hydrometer which is compact and which may be readily read and which will give an accurate indication of the temperature and the specific gravity of the solution being tested. The bulb of the thermometer is exposed to the liquid in which the hydrometer float is located, while the capillary tube of the thermometer is so protected that it is under no circumstances surrounded by the frequently discolored solution being tested. Thus, a clear and unobstructed temperature reading may be obtained through the side of the barrel.

While one form of the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

What I claim as my invention is:

1. In a hydrometer, a transparent barrel for receiving the liquid to be tested, a plug within the barrel having enlarged end portions in fluid-tight engagement with the interior of the barrel and a reduced intermediate portion spaced from the wall of the barrel to form therewith an annular chamber separated from the remainder of the barrel by said end portions, said plug having a longitudinal passage therethrough, a hydrometer float in the barrel above the plug, and a thermometer in the barrel having a bulb portion located above the plug and having a tube portion extending into said annular chamber.

2. In a hydrometer, a transparent barrel for receiving the liquid to be tested, a hydrometer float within the barrel, a resilient plug located in the barrel below the float and having fluid-tight engagement with the interior of the barrel, and a thermometer having a bulb portion disposed above the plug and having a tube portion extending downwardly through the plug, the tube portion being reversely bent to provide an upwardly extending temperature-indicating portion disposed adjacent one side of the barrel so as to be visible through the barrel.

3. In a hydrometer, a transparent barrel for receiving the liquid to be tested, suction means connected to one end of said barrel, a nozzle at the other end of the barrel through which liquid may be drawn into the barrel, a resilient plug disposed within the barrel adjacent the nozzle end thereof, said resilient plug having portions arranged for sealing engagement with the interior of the barrel and having a passage through which liquid may pass from the nozzle end of the barrel into the portion of the barrel above said plug, a float located in the barrel above the plug, and a thermometer carried by said plug and having a bulb portion projecting above the plug so as to be adjacent to the said float.

4. In a hydrometer, a transparent barrel for receiving the liquid to be tested, suction means connected to one end of said barrel, a nozzle at the other end of the barrel through which liquid may be drawn into the barrel, a resilient plug disposed within the barrel adjacent the nozzle end thereof, said resilient plug having portions arranged for sealing engagement with the interior of the barrel and having a passage through which liquid may pass from the nozzle end of the barrel into the portion of the barrel above said plug, a thermometer carried by said plug and having a bulb portion projecting above the plug, a float located in the barrel above the plug, and means carried by the upper end of the plug for preventing contact of the float with the thermometer bulb.

5. In a hydrometer, a transparent barrel for receiving the liquid to be tested, suction means connected to one end of said barrel, a nozzle at the other end of the barrel, an elongated resilient plug disposed within the barrel having a passage through which liquid may pass from the nozzle end of the barrel to the portion of the barrel above the plug, said plug also having enlarged end portions which have sealing engagement with the interior of the barrel and a reduced body portion which cooperates with the inner wall of the barrel to provide an annular chamber disposed between the enlarged portions of the plug, a hydrometer float in the barrel, and a thermometer in the barrel having a temperature-indicating portion located in the said annular chamber.

6. In a hydrometer, a transparent barrel for receiving the liquid to be tested, suction means connected to one end of said barrel, a nozzle at the other end of the barrel, an elongated resilient plug disposed within the barrel having a passage through which liquid may pass from the nozzle end of the barrel to the portion of the barrel above the plug, said plug also having enlarged end portions which have sealing engagement with the interior of the barrel and having a reduced body portion which cooperates with the inner wall of the barrel to provide an annular chamber disposed between the enlarged portions of the plug, a hydrometer float in the barrel above the said plug, and a thermometer carried by the plug and having a bulb portion disposed in the portion of the barrel above the plug and having an indicating tube portion located in the said annular chamber.

7. In a hydrometer, a transparent barrel for receiving the liquid to be tested, suction means at one end of the barrel by which liquid may be drawn into the barrel, a nozzle at the other end of the barrel through which liquid may enter the barrel, an elongated plug in the barrel adjacent the nozzle end thereof having enlarged end portions which have sealing engagement with the interior of the barrel, said plug being also provided with passages through which liquid may flow from the nozzle portion of the barrel to the portion of the barrel above the plug, a hydrometer float in the barrel above the plug, and a thermometer carried by the plug having a bulb portion disposed above the plug and a temperature indicating tube portion disposed between the plug and the wall of the barrel whereby the temperature-indicating tube portion of the thermometer is visible through the wall of the barrel.

8. In a hydrometer, a transparent barrel, a suction bulb at one end of the barrel, a nozzle at the other end of the barrel, an elongated plug fitted in the barrel adjacent the nozzle end thereof and having passages through which liquid may flow from the nozzle end of the barrel to above the said plug, said plug being provided with enlarged end portions having sealing engagement with the interior of the barrel and also having a reduced body portion which cooperates with the inner wall of the barrel to provide an annular chamber between the said enlarged portions, a hydrometer float in the barrel above the said plug, a thermometer carried by the plug and having a tube portion located in the said annular chamber, and a sleeve embracing the reduced portion of the plug, said sleeve having a scale which cooperates with the tube portion of the thermometer.

9. In a hydrometer, a transparent barrel for receiving the liquid to be tested, a plug within the barrel intermediate its ends, said plug having enlarged end portions in fluid tight engagement with the interior of the barrel and a reduced intermediate portion spaced from the wall of the barrel to form therewith an annular chamber separated from the remainder of the barrel by said end portions, said plug also having a passage therethrough to permit flow of fluid from one end of the barrel to the other end thereof, a hydrometer float in the barrel, and a thermometer having a bulb portion in the barrel exteriorly of the plug and a temperature indicating portion in said chamber.

10. In a hydrometer, a transparent barrel for receiving the liquid to be tested, a resilient plug within the barrel adjacent the lower end thereof, the end portions of said plug being in fluid tight engagement with the interior of the barrel, said plug being reduced in cross-section intermediate said end portions, said reduced portion being homogeneously integral with said end portions and spaced from the wall of said barrel to form with the barrel a chamber separated from the remainder of the barrel, said plug also having a passage therethrough to permit flow of fluid from one end of the barrel to the other end thereof, a hydrometer float in the barrel, and a thermometer having a bulb portion in the float end of said barrel sealed from the chamber and a temperature indicating portion in said chamber sealed from said remainder of the barrel.

SAMUEL S. McCLURE.